Sept. 11, 1928. 1,684,294
W. H. BABCOCK
DIRIGIBLE HEADLIGHT FOR AUTOMOBILES
Filed June 16, 1927 2 Sheets-Sheet 2
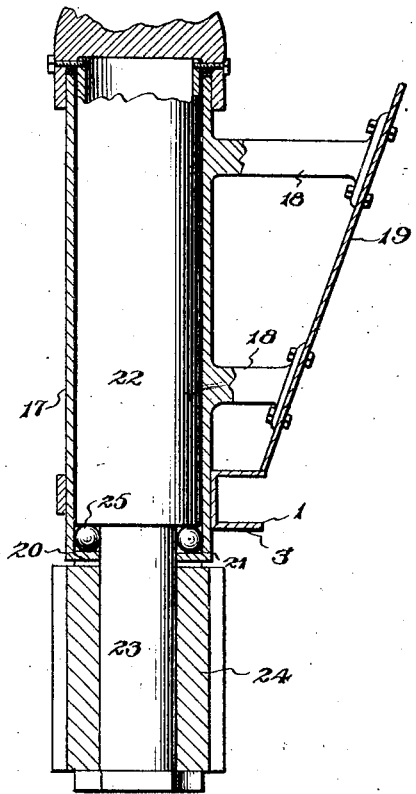
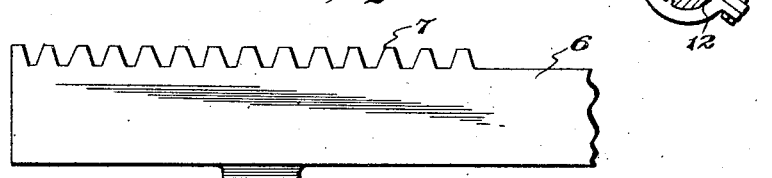
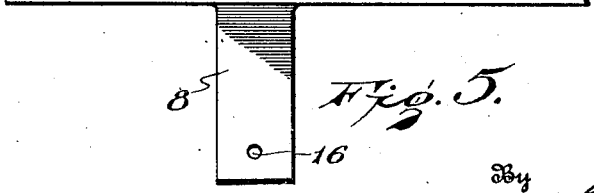
Inventor
W. H. Babcock
By Lacey & Lacey, Attorneys Patented Sept. 11, 1928.

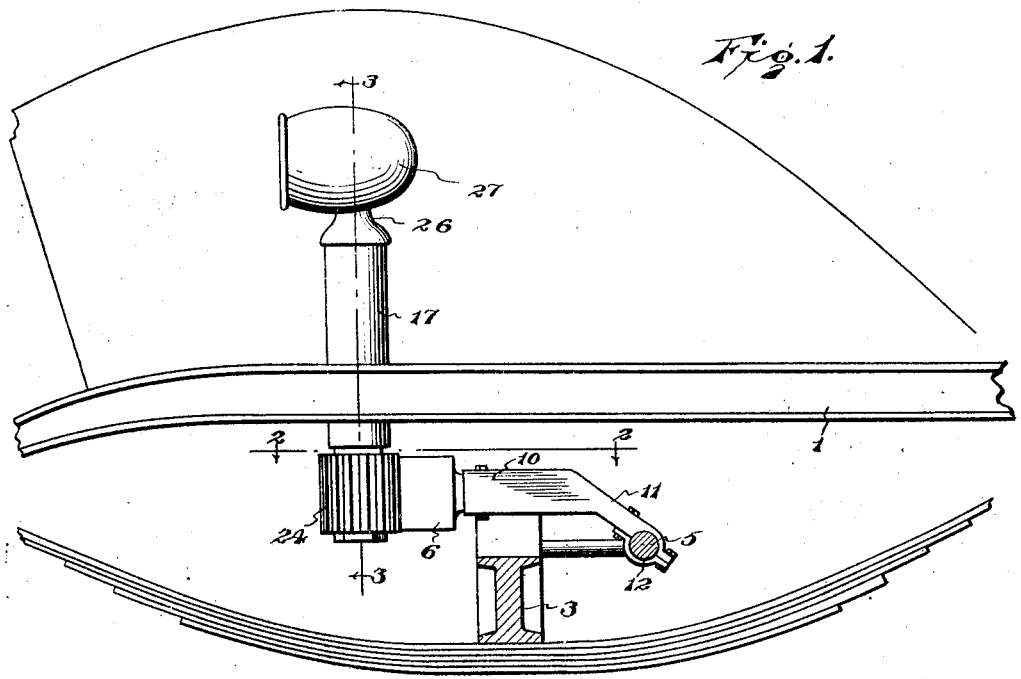
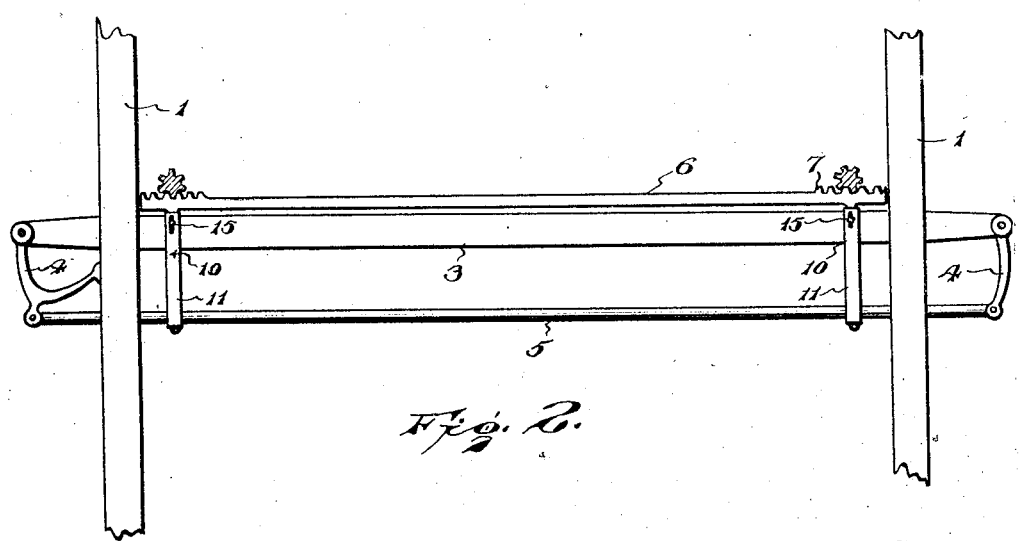

1,684,294

UNITED STATES PATENT OFFICE.

WILLIAM H. BABCOCK, OF GROTON, CONNECTICUT.

DIRIGIBLE HEADLIGHT FOR AUTOMOBILES.

Application filed June 16, 1927. Serial No. 199,336.

The present invention is directed to improvements in dirigible headlights for automobiles.

The primary object of the invention is to provide a device of this character so constructed that the headlights of the automobile will be automatically turned to project the light rays therefrom in the line of travel of the automobile whether the automobile is turning a curve or traveling in a straight course.

Another object of the invention is to provide a device of this kind which is extremely simple in construction, can be easily applied to the automobile, and one which is effective in operation and can be manufactured at a very small cost.

In the accompanying drawings:

Figure 1 is a side elevation of the device showing it in place upon an automobile.

Figure 2 is a sectional view on line 2—2 of Figure 1.

Figure 3 is a sectional view on line 3—3 of Figure 1.

Figure 4 is a detail sectional view showing the manner in which the bar is coupled to the connecting rod.

Figure 5 is a fragmentary plan view of the bar.

Referring to the drawings, 1 designates the side bars, 2 the spring which supports the axle 3, and to the ends of which are connected the steering arms 4, all of which are of conventional construction. These arms have pivotally connected thereto the ends of the usual tie rod 5.

A bar 6 is provided and has rack teeth 7 formed upon its ends, said rack bar having extensions 8 which extend rearwardly and are slidably engaged in the sockets 9 formed in the arms 10. The rear ends of the arms 10 terminate in downwardly inclined arms 11 which are secured to the bar 6 by clamps 12 in order that sliding movement will be imparted to the bar 6 when the tie rod 5 is moved.

Coil springs 13 are located in the socket 9 and have their outer ends engaged with the inner ends of the extensions 8. The arms 10 have registering slots 14 formed therein for slidably receiving the ends of the bolts 15 which are engaged in the openings 16 formed in said extensions.

A pair of casings 17 are provided and have brackets 18 carried thereby for attachment to the mud guards 19, the casings having inturned flanges 20 upon which the ball bearings 21 rest.

Rotatably mounted in the casings are tubular shafts 22, the lower ends of which are provided with spindles 23 which extend from the lower ends of the casings and have fixed thereto pinions 24.

The shafts 22 are provided with annular shoulders 25 for engagement with the ball bearings 21.

The pinions 24 are adapted to mesh with the rack teeth 7 to impart rotary movement to the shafts 22 when the bar 6 is reciprocated.

Pedestals 26 are engaged upon the upper ends of the shafts 22 and are fixed thereto by screws 27, said pedestals having upon their upper ends the headlights 28.

It will be obvious that when the vehicle is turning the bar 6 will be moved, thereby transmitting rotary movement to the shafts 22 in order that the headlights will direct their rays in the direction of travel of the vehicle.

The springs 13 compensates for any play between the connecting rods 5 and the bar 6, and will yieldably maintain the pinions 24 in mesh with the teeth 7.

Having thus described the invention, I claim:

In a device of the class described, comprising in combination, the tie rod of an automobile, arms connected to the tie rod and having sockets therein, a bar having rack teeth, said bar having extensions carried thereby and engageable in the sockets of the arms, springs in the sockets engaged with the extensions, bolts carried by the extensions and slidably engaged with the arms, casings supported by the automobile, shafts rotatable in the casings and having spindles carried thereby which extend below the casings, gears fixed to the spindles, pedestals fixed to the upper ends of the shafts and rotatable therewith, headlights upon the pedestals, said gears being adapted to mesh with the rack teeth of the bar, whereby rotary movement is imparted to the shafts upon movement of the tie rod and bar.

In testimony whereof I affix my signature.

WILLIAM H. BABCOCK. [L. S.]